United States Patent [19]

Garulli et al.

[11] Patent Number: 4,833,979

[45] Date of Patent: May 30, 1989

[54] AUTOMATIC MACHINE FOR MAKING COFFEE OR SIMILAR BEVERAGES

[75] Inventors: Augusto Garulli; Gaetano Donizetti, both of Bergamo; Mauro Bandelli, Curno, all of Italy

[73] Assignee: Zanussi Grandi Impianti S.p.A., Pordenone, Italy

[21] Appl. No.: 210,018

[22] Filed: Jun. 22, 1988

[30] Foreign Application Priority Data

Jun. 23, 1987 [IT] Italy ............................... 45728 A/87

[51] Int. Cl.⁴ ............................................. A47J 31/32
[52] U.S. Cl. ....................................... 99/287; 99/297; 99/302 P
[58] Field of Search ................. 99/287, 297, 302 R, 99/302 P, 300, 275, 279, 323.1, 289 R, 289 P; 926/433

[56] References Cited

U.S. PATENT DOCUMENTS

| | | | |
|---|---|---|---|
| 3,369,478 | 2/1968 | Black | 99/289 |
| 3,552,976 | 11/1966 | King | 99/302 P |
| 3,565,641 | 4/1968 | King | 99/302 P |
| 4,632,023 | 12/1986 | King | 99/287 |

Primary Examiner—Robert W. Jenkins
Attorney, Agent, or Firm—Wenderoth, Lind & Ponack

[57] ABSTRACT

An automatic machine for making coffee or a similar beverage includes an infusion chamber at atmospheric pressure and adapted to accommodate a mixture of liquid such as hot water and a material serving as the base of the beverage. The infusion chamber has at the bottom thereof a surface permeable to fluids and impermeable to the material. An extraction chamber is positioned below the bottom of the infusion chamber and communicates therewith through the surface. A first control mechanism is positioned within the extraction chamber for moving upwardly therein to force air through the surface into the mixture in the infusion chamber and for moving downwardly within the extraction chamber to extract beverage from the infusion chamber through the surface into the extraction chamber. A second control mechanism is provided within the extraction chamber for forcing beverage within the extraction chamber therefrom under pressure to a dispensing area.

8 Claims, 5 Drawing Sheets

AUTOMATIC MACHINE FOR MAKING COFFEE OR SIMILAR BEVERAGES

BACKGROUND OF THE INVENTION

The present invention relates to an automatic machine for making a beverage from a liquid such as hot water and a base material such as freshly ground coffee. A process and related automatic machine for making coffee in measured quantities are disclosed respectively in U.S. Pat. No. 3,552,976 and U.S. Pat. No. 3,565,641. Coffee is made in accordance with this known arrangement by the following sequence. Measured amounts of ground coffee and hot water are introduced at atmospheric pressure into an infusion chamber equipped at the bottom thereof with an appropriate filter. Air is introduced into the infusion chamber through the bottom filter to agitate the water/coffee mixture. Brewed coffee is extracted through the filter at the bottom of the infusion chamber and is funneled to a dispensing area. Particularly, during certain phases of the operating cycle of the machine, the bottom of the infusion chamber is hermetically sealed to a lower cylinder in which slides a piston. When the piston is moved upwardly toward the bottom of the infusion chamber, the piston introduces air through the filter into the infusion chamber. When the piston is caused to move downwardly the beverage is brewed and extracted through the filter due to depressurization.

Such a solution is advantageous since it allows coffee having particularly good organoleptic properties to be made in a short period of time. Such a solution however does have certain inconveniences. Particularly, the coffee extracted from the infusion chamber must be passed to the dispensing area by the force of gravity since the coffee receives no positive pressure from the sliding movement of the piston. Therefore, this known machine provides limitations as to the relative positioning of the various components, since the entire infusion complex must be placed above the dispensing area which, for reasons of practicality and standardization, also must be located a certain minimum height above the floor. This of course also affects the positioning of the other basic components of the machine, for example mechanisms necessary to store and funnel the ground coffee to the infusion chamber, and possibly also to grind the coffee, and the water feed and/or heating mechanisms, unless they are designed in a complicated and uneconomical manner. Thus, this known coffee machine is undesirably cumbersome and/or insufficiently rational with regard to the relative positioning of its various components.

SUMMARY OF THE INVENTION

Accordingly, an object of the present invention is to provide a machine for making coffee or similar beverages automatically, in a short period of time, infused at atmospheric pressure and having advantageous organoleptic properties, while substantially eliminating the above discussed prior art disadvantages.

It is a further object of the present invention to provide an automatic machine for making coffee or similar beverages whereby it is possible to dispense the beverage under sufficient pressure without requiring the use of complex, costly and/or unreliable devices.

These objects are achieved in accordance with the present invention by the provision of an automatic machine for making coffee or similar beverages and including an infusion chamber at atmospheric pressure and adapted to accommodate a mixture of a liquid such as hot water and of a material serving as the base of the beverage. The infusion chamber has at the bottom thereof a surface, such as a filter, permeable to fluids and impermeable to the base material. An extraction chamber is positioned beneath the bottom of the infusion chamber and communicates therewith through the surface. The top of the extraction chamber can be sealed to the bottom of the infusion chamber, but the infusion chamber can be separated when necessary from the extraction chamber and the surface. A first control means is provided within the extraction chamber for moving upwardly therein to force air through the surface into the mixture in the infusion chamber and for moving downwardly within the extraction chamber to extract beverage from the infusion chamber through the surface into the extraction chamber. A second control means is positioned within the extraction chamber for forcing beverage within the extraction chamber therefrom under pressure to at least one dispensing area. Preferably, the extraction chamber communicates through the bottom thereof with the dispensing area. The second control means is in the form of a piston which slides within the extraction chamber from an upper position adjacent the surface when the first control means extracts beverage through the surface from the control means, successively downwardly toward the bottom of the extraction chamber to exert pressure on the beverage therein and to force such beverage through the bottom of the extraction chamber to the dispensing area.

BRIEF DESCRIPTION OF THE DRAWINGS

Other objects, features and advantages of the present invention will be apparent from the following detailed description of a preferred embodiment thereof, with reference to the accompanying drawings, wherein.

DETAILED DESCRIPTION OF THE INVENTION

Figure 5:
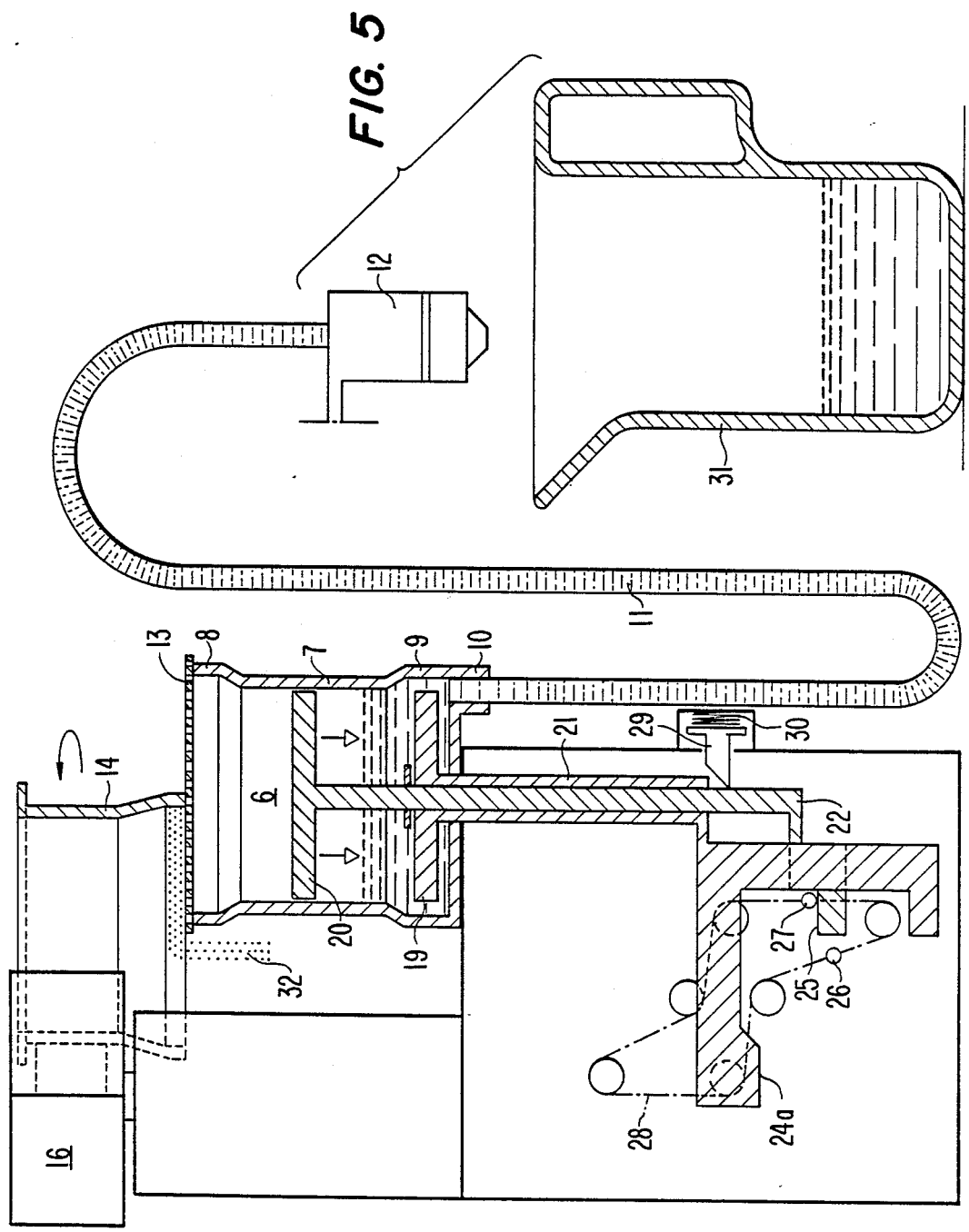

The machine according to the present invention includes a fixed member defining an extraction chamber 6, preferably circular in section. Chamber 6 includes a middle section 7 of relatively smaller diameter, as well as an upper section 8 and a lower section 9 having relatively larger diameters. At the bottom of extraction chamber 6 is an opening 10 connected by a conduit 11 to at least one dispensing area 12 (FIG. 5). The dispensing area or member 12 may be positioned at a selected advantageous location in the machine, preferably at a position high enough to ensure the most convenient use of the machine.

The top of chamber 6 is closed by a filtering surface 13 which can be in the form of a metal and/or paper strip-type filter that additionally may be provided with progressive feed and is described in U.S. Pat. No. 3,565,641. Filtering surface 13 is permeable to fluids and is impermeable to a beverage base material, to be described below.

In a manner to be explained in more detail below, during certain phases of the operating cycle of the machine, chamber 6 communicates in a hermetically sealed manner via filter surface 13 with an overmounted sleeve 14, substantially cylindrical in configuration and open at the top thereof to the atmosphere. Sleeve 14 defines an infusion chamber. Sleeve 14 is connected through an arm 15 to a motorized control component 16 designed to rotate sleeve 14 in a horizontal plane, in a known manner, disengaging sleeve 14 from chamber 6 and filtering surface 13, as shown in FIG. 5. When sleeve 14 is in the position shown in FIGS. 1-4, sleeve 14 is positioned beneath two feed mechanisms 17, 18 (FIG. 1) designed to supply respectively measured quantities of hot water and the material serving as the base of the beverage to be made, for example ground coffee, into the infusion chamber within sleeve 14. Mechanism 18 must be designed to be connected preferably to a reservoir for storing freshly ground coffee, not shown for purposes of simplicity of illustration. As indicated above, surface 13 is permeablwe to fluids and is impermeable to the material serving as the base of the beverage and, under the operating conditions shown in FIGS. 1-4, constitutes the bottom of the infusion chamber at atmospheric pressure defined within sleeve 14.

Figure 1:
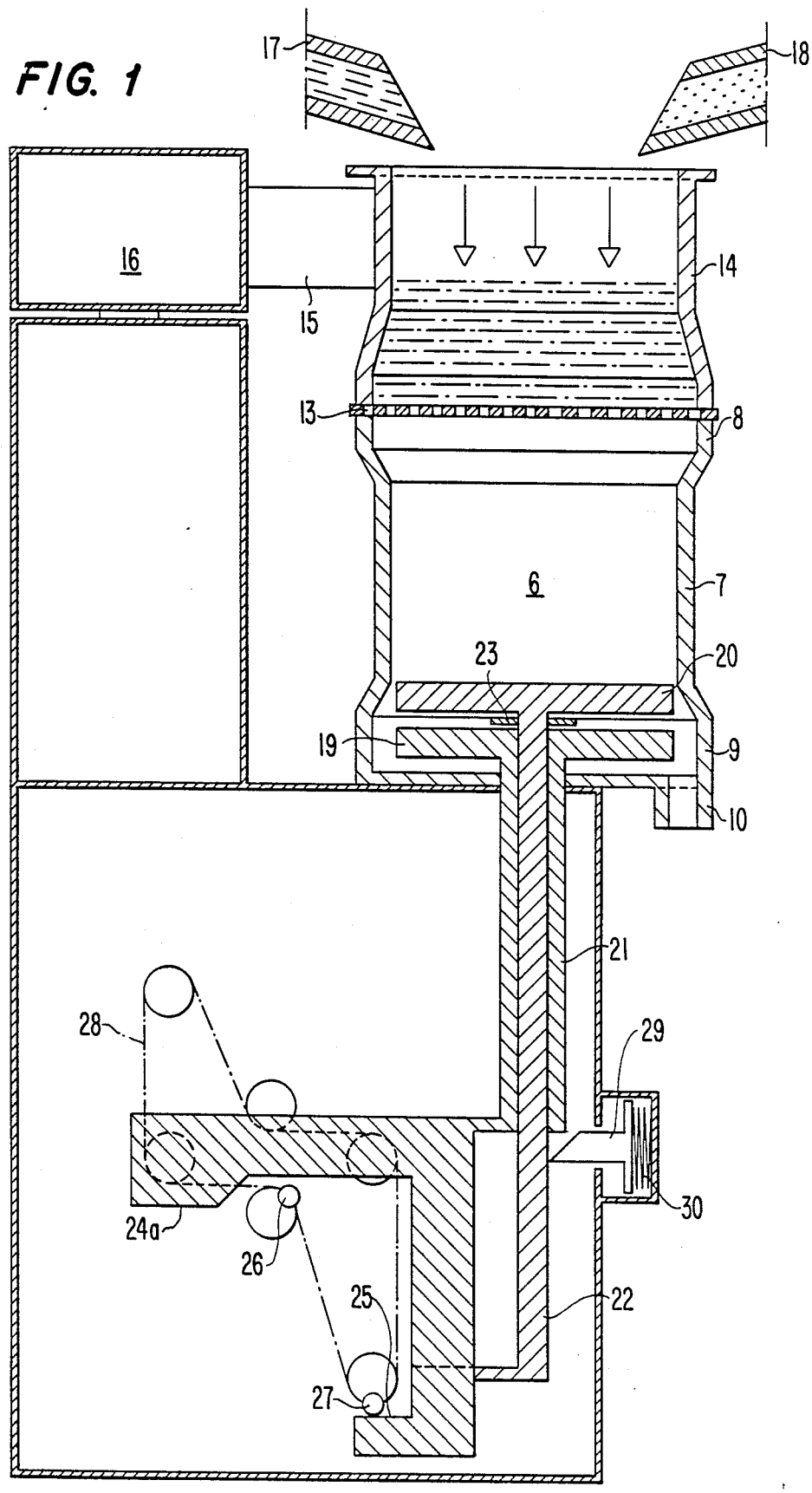
FIGS. 1 through 5 are schematic cross sectional views illustrating a machine according to the present invention in various sequential operating stages thereof.

Within cylindrical chamber 6, which is indicated above defines an extraction chamber, are placed first and second coaxial and superimposed pistons 19, 20. These pistons slide axially in an independent manner within chamber 6, with their lateral surfaces substantially fitting the inside lateral surface of the middle section 7 of chamber 6. The height and cycle of movement of pistons 19, 20 are such that they can slide within chamber 6 between two extreme positions, i.e. a resting position as shown in FIG. 1 wherein lower piston 19 is within lower widened section 9 of chamber 6 and piston 20 still cooperates with middle portion 7 of chamber 6, and an upper working position shown in FIG. 2 in which piston 20 is positioned within upper widened section 8 of chamber 6 and piston 19 still cooperates with middle portion 7 of chamber 6. Pistons 19 and 20 are provided with respective piston rods 21, 22. Particularly, piston rod 22 slides freely within sealed piston rod 21. For this purpose, piston 19 can be provided at its top with a rubber ring 23 to form a seal with respect to piston rod 22.

The lower ends of rods 21, 22 opposite respective pistons 19, 20 are formed with corresponding lateral projections or similar elements positioned side-by-side and formed in a manner similar to that illustrated in FIGS. 1-5 with respective guide surfaces 24a and 24b, 25. Such guide surfaces are designed to cooperate respectively with first and second control pins 26, 27 that have different lengths and that are attached to a drive chain or similar device 28. By means of a series of driving gears drive chain 28 is made to pass along a curvilinear closed ring configuration, illustrated in the drawings, and such driving movement is motorized in a synchronized manner with the operation of control component 16. The motorized control devices and the reciprocal synchronization device are elements known in and of themselves and are not illustrated or described in detail. One skilled in the art would understand what types of devices can be employed to achieve the illustrated and described operations herein. It particularly is contemplated that any known such control and synchronization devices can be employed to achieve the movements described herein.

The machine also includes a flexible control such as, for example, a member 29 having an inclined plane and urged outwardly into an operative position by means of a compression spring 30. Inclined plane 29 thus is urged outwardly into contact with piston rod 22 of piston 20 and in the upper position of piston 20 shown in FIG. 2 operates to maintain such upper position. It of course is to be understood that the positioning of control member 29 and the calibration of spring 30 are determined according to the particular dimensional characteristics of the components of a given machine.

Figure 2:
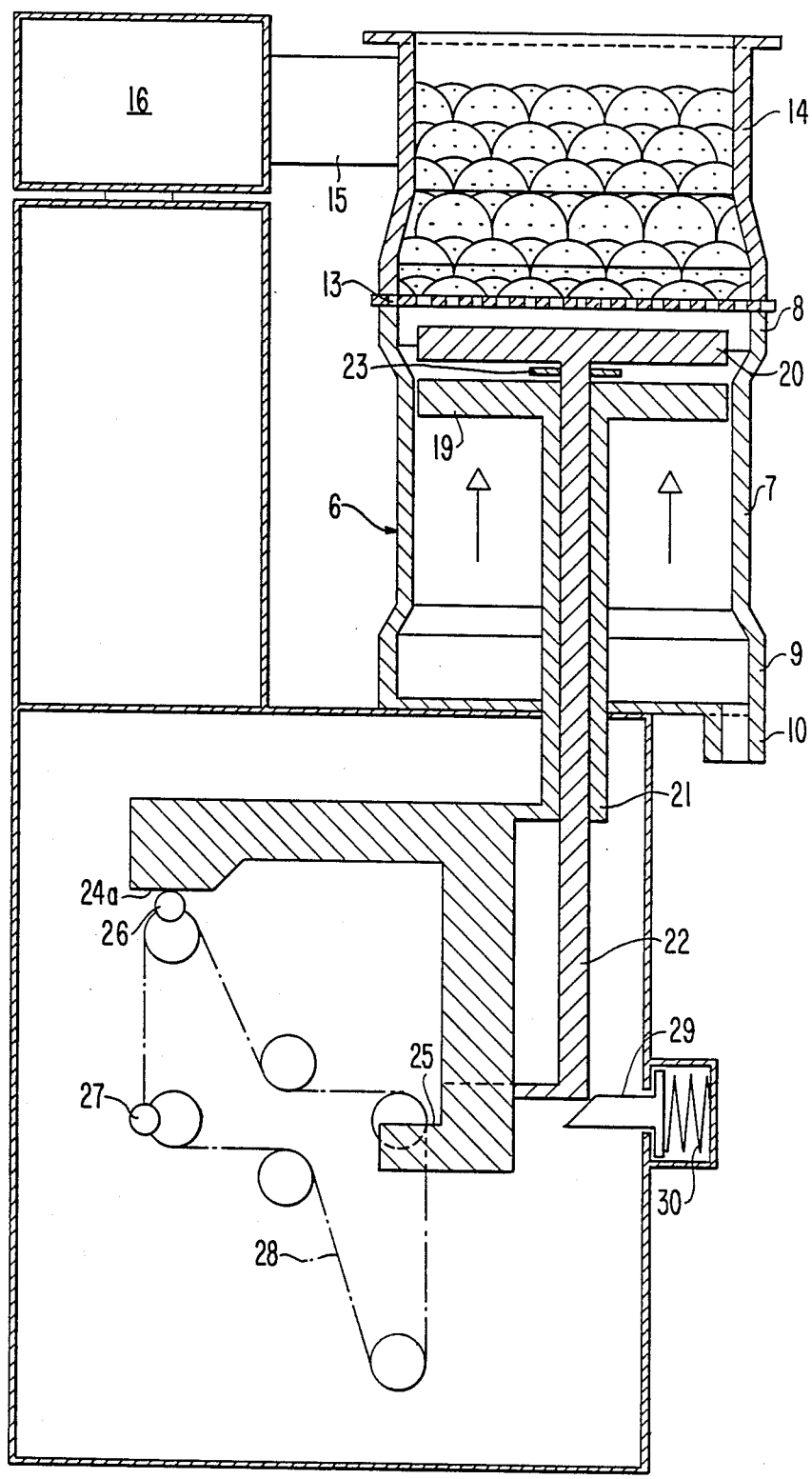
Figure 3:
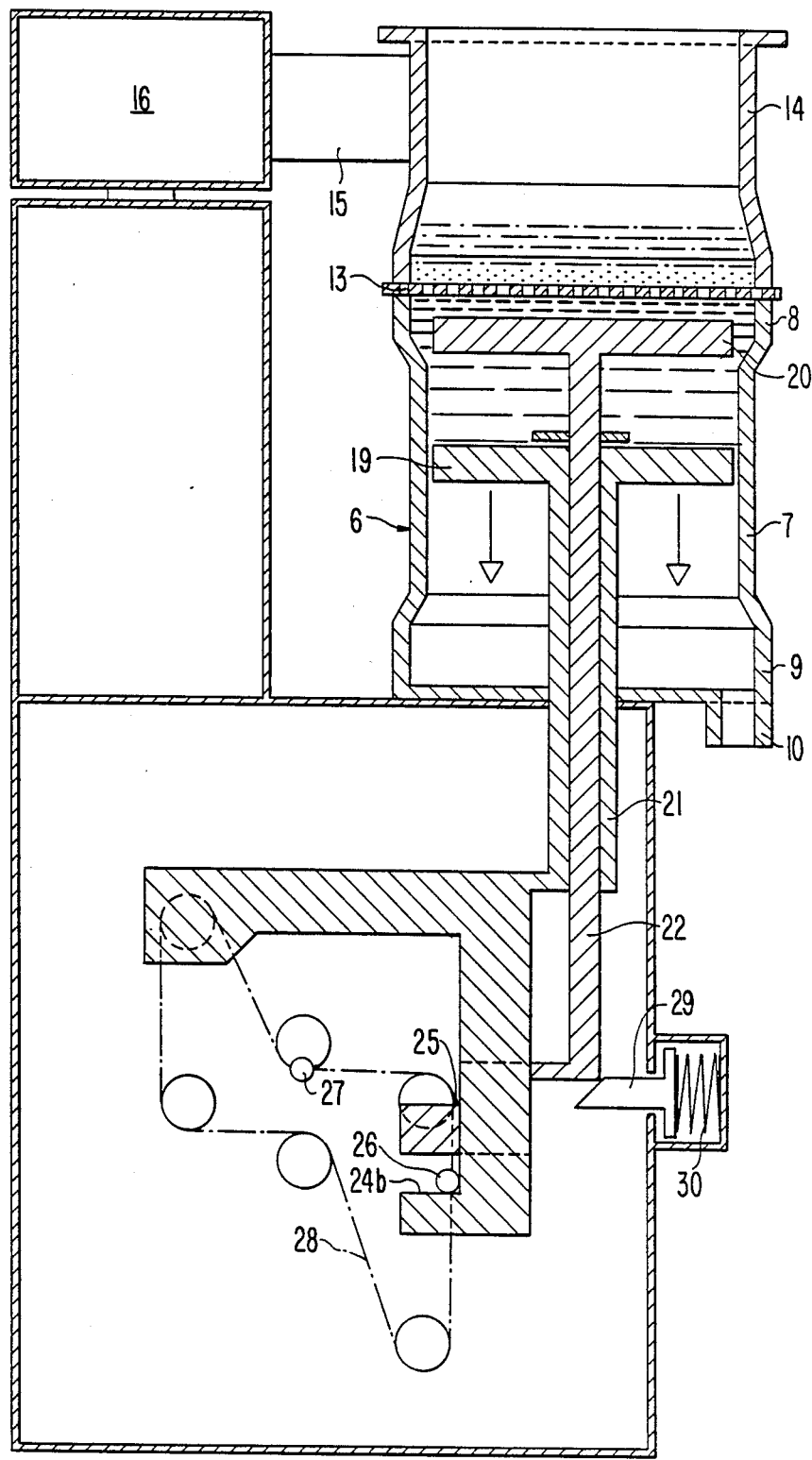

The operation of the machine of the present now will be described. At the beginning of each operating cycle the components of the machine are in the positions shown in FIG. 1, and infusion chamber 14 is partially filled with a mixture of hot water and the material serving as the base for the beverage, for example ground coffee, supplied in measured quantities by feed mechanisms 17, 18. It is of course to be understood that the quantities of the mixture can vary according to the particular requirements, for example the content can vary from a single cup to an amount for a plurality of cups. Drive chain 28 then is rotated in the clockwise direction as illustrated in the drawings, causing control pin 26 to engage guide surface 24a and to move such guide surface upwardly, thereby raising piston 19 and thereby consequently also raising piston 20 within chamber 6 (FIG. 2). The raising of pistons 19 and 20 causes air to be introduced through filter 13 into infusion chamber 14, and such air advantageously stirs the mixture of water and ground coffee in a manner in and of itself known. When the pistons reach the end of the upper cycle as shown in FIG. 2, control member 29 is urged by spring 30 to an outward position and cooperates with the bottom of rod 22 to maintain piston 20 in its upper position. Pistons 19 and 20 then are maintained stationary in such upper positions for a predetermined infusion period. This depends on the speed of rotation of chain 28 as well as the geometric characteristics thereof and of guide surface 24a while pin 26 disengages from surface 24a. When infusion is completed, pin 26 engages guide surface 24b during its descending movement, thereby moving piston 19 downwardly, as shown in FIG. 3. During this phase, piston 20 is maintained at its upper position by control member 29 and spring 30. Thus, the downward movement of piston 19 extracts infused coffee due to depressurization of chamber 14 through filter surface 13. Such brewed coffee or other beverage passes through filter surface 13 and descends into extraction chamber 16 by passing through the annular space between the outer surface of piston 20 and the inner surface of upper section 8 of chamber 6.

Figure 4:
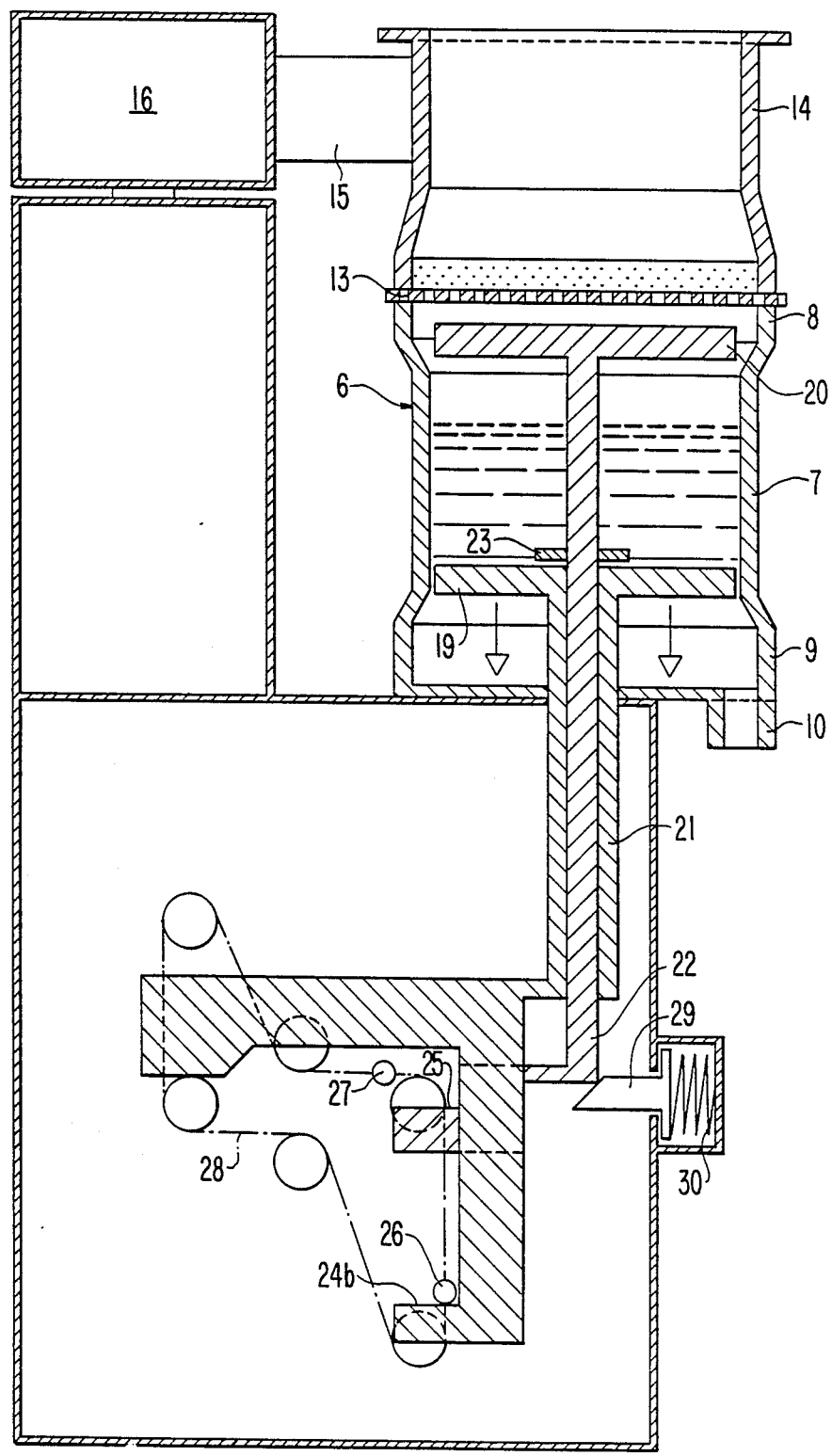

When piston 19 reaches the end of its descending cycle it is located within lower section 9 of chamber 6, as shown in FIG. 5. At this time, pin 26 is disengaged from guide surface 24b. At such time substantially all of the measured amount of infused beverage will have been extracted from chamber 14 into chamber 6. Pin 27 of drive chain 28 then will engage with guide surface 25 of piston 20. FIG. 4 shows pin 27 just about to contact surface 25. When such contact occurs, then piston rod 22 and piston 20 are moved downwardly, overcoming the force of spring 30 to retract control member 29. As shown in FIG. 5, downward movement of piston 20 exerts pressure on the underlying measured portion of beverage in extraction chamber 6 and thus forces such beverage under pressure through outlet 10 of extraction chamber 6 and through conduit 11 to dispensing area 12. The beverage is allowed to pass through the annular space between the outer edge of piston 19 and the inner surface of lower section 9 of chamber 6.

In accordance with the present invention, it is possible to place the dispensing area 12, under which a collection chamber 31 of course is provided, at practically any level of the machine, regardless of the position of the infusion and extraction chambers. In other words, the dispensing area 12 does not need to be located below the extraction chamber, since the downward movement of piston 20 forces the brewed beverage from the extraction chamber under pressure. Thus, according to the present invention it is possible to provide a machine for making coffee or similar beverages wherein the functional advantages and simple construction known in the trade are maintained, while the relative positioning of the various components easily can be optimized.

Simultaneously with or successive to the phase during which the coffee is dispensed (FIG. 5), sleeve 14 is rotated by motorized unit 15, 16 to disengage sleeve 14 from filtering surface 13 (which automatically is cleaned) and extraction chamber 6 and to empty the used amount of coffee 32 in a known manner into an appropriate collection area (not shown).

At the end of the phase in which the coffee is dispensed entirely from extraction chamber 6, pistons 19, 20 again are at their respective lower positions (as shown in FIG. 1) and sleeve 14 again is brought to position over extraction chamber 6. Thus, the machine is ready to begin a new cycle to prepare and dispense the beverage.

It is of course understood that various changes and modifications can be made to the described and illustrated arrangement without departing from the scope of the present invention. Furthermore, it is to be understood that the machine of the present invention can be used to prepare various beverages other than coffee, for example tea by use of tea leaves. Furthermore, mechanisms 24-30 for control and movement of pistons 19, 20 can be replaced by any other equivalent structure capable of achieving the sequential movements discussed above. One of ordinary skill in the art readily would understand what types of other control and synchronizing structures can be employed. Still further, one or both of pistons 19, 20 could be replaced by similar structure to exert the necessary pressure on the respective fluids, i.e. air and/or brewed beverage. It particularly is contemplated that the pressure to dispense the extracted beverage from chamber 6 could be provided by, for example, a conventional pumping device, known in and of itself and therefore not illustrated.

What is claimed:

1. A machine for making coffee or a similar beverage, said machine comprising:
    an infusion chamber at atmospheric pressure and adapted to accommodate a mixture of a liquid such as hot water and of a material serving as the base of the beverage, said infusion chamber having at the bottom thereof a surface permeable to fluids and impermeable to said material;
    an extraction chamber positioned below the bottom of said infusion chamber and communicating therewith through said surface;
    first control means within said extraction chamber for moving upwardly therein to force air through said surface into said mixture in said infusion chamber and for moving downwardly within said extraction chamber to extract beverage from said infusion chamber through said surface into said extraction chamber; and
    second control means within said extraction chamber for forcing beverage within said extraction chamber therefrom under pressure to a dispensing area.

2. A machine as claimed in claim 1, wherein said extraction chamber has at the bottom thereof means for connection to the dispensing area, and said second control means comprises a piston slidably movable within said extraction chamber from an upper position adjacent said surface when said first control means extracts beverage through said surface successively toward said bottom of said extraction chamber to exert pressure on the beverage therein and to force such beverage through said connection means.

3. A machine as claimed in claim 2, wherein said extraction chamber includes a middle section having a relatively smaller inner cross section substantially fitting the laterally outer surface of said piston, and an upper section having a relatively longer inner cross section, said piston fitting within said upper section when in said upper position.

4. A machine as claimed in claim 3, wherein said first control means comprises an additional piston slidably movable within said extraction chamber substantially independently of movement therein of said piston, said piston being coaxial with and positioned above said additional piston.

5. A machine as claimed in claim 4, wherein said extraction chamber includes a lower section having an inner cross section longer than that of said middle section, said additional piston being positioned within said lower section when said piston moves downwardly from said upper position thereof to exert pressure on the beverage.

6. A machine as claimed in claim 4, further comprising motorized regulating means operably associated with said piston and said additional piston for synchronizing respective movements thereof within said extraction chamber.

7. A machine as claimed in claim 6, wherein said piston and said additional piston have integral therewith respective guide surfaces, and said regulating means comprises a motorized drive chain moving in a curvilinear path and control pins mounted on said drive chain for abutment with said guide surfaces to move said piston and said additional piston within said extraction chamber.

8. A machine as claimed in claim 1, wherein the dispensing area is positioned at the same level as or higher than said extraction chamber.

* * * * *